유S010237605B2

United States Patent
Oak et al.

(10) Patent No.: US 10,237,605 B2
(45) Date of Patent: Mar. 19, 2019

(54) INPUT/OUTPUT SYSTEM AND METHOD FOR SET-TOP BOX USING TERMINAL

(71) Applicant: NHN Entertainment Corporation, Seongnam-si (KR)

(72) Inventors: Kyoung Hwan Oak, Seongnam-si (KR); Hyeyoung Kim, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 0 days.

(21) Appl. No.: 15/404,480

(22) Filed: Jan. 12, 2017

(65) Prior Publication Data
US 2017/0214961 A1    Jul. 27, 2017

(30) Foreign Application Priority Data
Jan. 21, 2016    (KR) .................. 10-2016-0007762

(51) Int. Cl.
*H04N 21/422*    (2011.01)
(52) U.S. Cl.
CPC ............... *H04N 21/42207* (2013.01)
(58) Field of Classification Search
CPC ............ H04N 21/42207; H04N 21/153
USPC .......................................... 725/153
See application file for complete search history.

(56) References Cited

U.S. PATENT DOCUMENTS

| | | | | |
|---|---|---|---|---|
| 2007/0256098 A1* | 11/2007 | Yum | .................... | H04N 5/4401 725/38 |
| 2011/0040621 A1* | 2/2011 | Ginsberg | ........... | G01C 21/3492 705/14.49 |
| 2011/0197229 A1* | 8/2011 | Yassa | .................... | H04N 7/163 725/39 |
| 2012/0054378 A1* | 3/2012 | Malamant | ........... | G06F 13/4295 710/19 |
| 2013/0081089 A1* | 3/2013 | Kim | .................... | H04N 21/4122 725/61 |
| 2014/0373074 A1* | 12/2014 | Hwang | ............ | H04N 21/42201 725/56 |
| 2015/0181286 A1* | 6/2015 | Gonzalez | ........... | H04N 21/6143 725/28 |

FOREIGN PATENT DOCUMENTS

KR    10-2015-0057822    5/2015

OTHER PUBLICATIONS

Korean Publication KR200467510A—Remote Controller and Method for controlling equipments thereof, Chun, Park.*

* cited by examiner

*Primary Examiner* — Nathan J Flynn
*Assistant Examiner* — Caroline Somera
(74) *Attorney, Agent, or Firm* — H.C. Park & Associates, PLC

(57) ABSTRACT

An input/output system and a method for a set-top box using a terminal include making a connection with the terminal including a display unit or a speaker through wired or wireless communication, determining whether the terminal is in a receive enable state for image data or audio data, and sharing the image data or the audio data with the terminal by transmitting the image data or the audio data to the terminal to output an image through the display unit of the terminal or to output audio through the speaker of the terminal, when the terminal is in the receive enable state for the image data or the audio data.

19 Claims, 6 Drawing Sheets

US 10,237,605 B2

INPUT/OUTPUT SYSTEM AND METHOD FOR SET-TOP BOX USING TERMINAL

CROSS-REFERENCE TO RELATED APPLICATION

This applications claims priority from and the benefit of Korean Patent Application No. 10-2016-0007762 filed Jan. 21, 2016, which is hereby incorporated by reference for all purposes as if fully set forth herein.

BACKGROUND

Exemplary embodiments of the inventive concept described herein relate to an input/output system and a method for a set-top box using a terminal, and more particularly, relate to an input/output system and a method for a set-top box using a terminal, capable of connecting the terminal with the set-top box and using the terminal as an input/output device.

In general, set-top boxes are connected with external display devices, such as televisions, to appropriately convert external input signals and to display converted external input signals on the connected external display devices.

Existing set-top boxes are controlled by users through operating devices such as remote controls. However, the remote controls are generally realized in the form of dedicated remote controls only for specific set-top boxes, which degrades compatibility with other products. In addition, existing set-top boxes have limitations in that control signals are transmitted from the remote controls to the set-top boxes through unidirectional communication.

In order to effectively use set-top boxes having no display device, external display devices, such as televisions, are additionally required. However, the external display devices, such as the televisions, have movement and other functional limitations.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the inventive concept provide an input/output system and a method for a set-top box using a terminal, and more particularly provide a technique on an input/output system and a method for a set-top box using a terminal, capable of providing bidirectional communication in which the terminal is connected with the set-top box and used as an input or output device.

Exemplary embodiments of the inventive concept provide an input/output system and a method for a set-top box using a terminal, capable of connecting the terminal with the set-top box, from which an output device is absent, and using the terminal as the output device based on the Android® Debug Bridge (ADB), media transfer protocol (MTP), or picture transfer protocol (PTP), and capable of connecting the terminal with a set-top box, from which an input device is absent, and using the terminal as the input device, based on the ADB, the MTP, or the PTP.

According to an aspect of an exemplary embodiment, an input/output method for a set-top box using a terminal includes making a connection with the terminal including a display unit or a speaker through wired or wireless communication, determining whether the terminal is in a receive enable state for image data or audio data, and sharing data with the terminal by transmitting the image data or the audio data to the terminal to output an image through the display unit of the terminal or to output audio (e.g. a voice) through the speaker of the terminal, when the terminal is in the receive enable state for the image data or the audio data.

The input/output method may further include determining whether the set-top box is in a receive enable state for user input data from the terminal and receiving touch coordinates or keypad input values, which are input by a user through the display unit of the terminal, for control the set-top box, when the set-top box is in the receive enable state for the user input data from the terminal.

The image transmitted from the set-top box, from which a display unit is absent, may be output through the display unit of the terminal in real time, or the audio transmitted from the set-top box, from which a speaker is absent, may be output through the speaker of the terminal in real time. The set-top box may receive the touch coordinates or the keypad input values input by the user through the display unit of the terminal.

The making of connection with the terminal through the wired or wireless communication may include making a wired communication with the terminal based on a universal serial bus (USB) standard protocol to support a media transfer protocol (MTP) mode or a picture transfer protocol (PTP) mode at the terminal as a USB port of the terminal is connected with a USB port of the set-top box through a universal serial bus cable.

The making of connection with the terminal through the wired or wireless communication may include making a wireless communication with the terminal as a wireless communication module of the terminal is connected with a wireless communication module of the set-top box through at least one of Bluetooth, near field communication (NFC), and Wi-Fi.

The determining of whether the terminal is in the receive enable state for the image data or the audio data may include determining whether an application, which receives and outputs the image data or the audio data, is installed on the terminal, providing an install file or an install guide file of the application to guide installation of the application when an application, which receives and outputs the image data or the audio data, is not previously installed on the terminal, and running the application installed on the terminal.

The input/output method may further include outputting changed image data or changed audio data through the display unit of the terminal or inputting changed user input data into the set-top box and processing the changed user input data, when the shared data is changed as a call back system to detect data change is employed in a case that communication protocol connection, which transmits an instruction and receives a result, is available in the terminal.

The set-top box may constitute at least a part of an electronic device requiring inspection, and the sharing of the data with the terminal may include displaying a management menu of the electronic device requiring the inspection on the display unit through an application previously installed on the terminal to receive selection coordinates of an inspection menu input by a user, inspecting the electronic device requiring the inspection with respect to a menu corresponding to the received selection coordinates, and transmitting an inspection result to the terminal to display the inspection result on the display unit of the terminal after the inspection is performed.

The set-top box may constitute at least a part of a traffic signal control system, and the sharing of the data with the terminal may include displaying a control menu of the traffic signal control system through a display unit through an application previously installed on the terminal to receive selection coordinates of the control menu, which is input by a user, in the set-top box, and controlling the traffic signal control system based on the received selection coordinates.

According to another exemplary embodiment, an input/output system for a set-top box using a terminal includes a communication unit configured to make wired or wireless communication with the terminal including a display unit or a speaker, and a control unit configured to determine whether the terminal is in a receive enable state for image data or audio data and to share data with the terminal by transmitting the image data or the audio data to output an image through the display unit of the terminal or to output audio through the speaker of the terminal, when the terminal is in the receive enable state for the image data or the audio data.

The control unit may include a determination unit configured to determine whether the terminal is in a receive enable state for the image data or the audio data, and to determine whether the set-top box is in a receive enable state for user input data from the terminal. The control unit may also include a data outputting unit configured to share the data with the terminal by transmitting the image data or the audio data to output the image through the display unit of the terminal or to output the audio through the speaker of the terminal, when the terminal is in the receive enable state for the image data or the audio data. The control unit may further include an input processing unit configured to receive touch coordinates or a keypad input value, which is input by a user through the display unit of the terminal, when the set-top box is in a receive enable state for user input data from the terminal.

The communication unit may be configured to receive a content signal from a service providing server by being connected with each other through the wireless communication. The control unit may further include a signal processing unit configured to convert the content signal received from the service providing server into the image data or the audio data to be displayed or output.

The data outputting unit may be configured to output the image transmitted from the set-top box, from which a display unit is absent, through the display unit of the terminal in real time, or to output the audio transmitted from the set-top box, from which a speaker is absent, through the speaker of the terminal in real time. The input processing unit may be configured to allow the set-top box to receive the touch coordinates or keypad input values input by the user through the display unit of the terminal.

The communication unit may be configured to have a universal serial bus (USB) port to support a USB standard protocol, and to make the wired communication with the terminal to support a media transfer protocol (MTP) mode or a picture transfer protocol (PTP) mode at the terminal when a USB port of the terminal is connected with a USB port of the set-top box through a USB cable.

The communication unit may include a wireless communication module to make the wireless communication with the terminal when a wireless communication module of the terminal is connected with a wireless communication module of the set-top box through at least one of Bluetooth, near field communication (NFC), and Wi-Fi.

The control unit may further include a change detecting unit configured to transmit information to output changed image data or changed audio data through the display unit of the terminal or the speaker of the terminal or to input changed user input data into the input processing unit to process the changed user input data, when the shared data is changed. A call back system may be used to detect data change when a communication protocol connection, which transmits an instruction and receives a result, is available in the terminal.

According to another exemplary embodiment, an input/output system for a set-top box using a terminal includes the set-top box including a communication unit configured to make wired or wireless communication with the terminal, and a control unit configured to determine whether the terminal is in a receive enable state for image data or audio data, to determine whether the set-top box is in a receive enable state for user input data from the terminal, to share data with the terminal by transmitting the image data or the audio data to the terminal when the terminal is in the receive enable state for the image data or the audio data, and to receive touch coordinates or a keypad input value, which is input by a user, when the set-top box is in the receive enable state for the user enable state from the terminal. The system further includes the terminal including a communication unit configured to be connected with the communication unit of the set-top box to make wired or wireless communication, a display unit configured to receive the touch coordinates or the keypad input value, which is input by the user, to receive an image from the set-top box, and to output the image, a speaker configured to receive audio from the set-top box and to output the audio, and a control unit configured to output the image and the audio, which are received from the set-top box, through an application in real time, and to receive an install file or an install guide file of the application from the set-top box and to guide installation of the application when an application, which receives the image data or the audio data, is not previously installed on the terminal.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION OF THE ILLUSTRATED EMBODIMENTS

Figure 1:
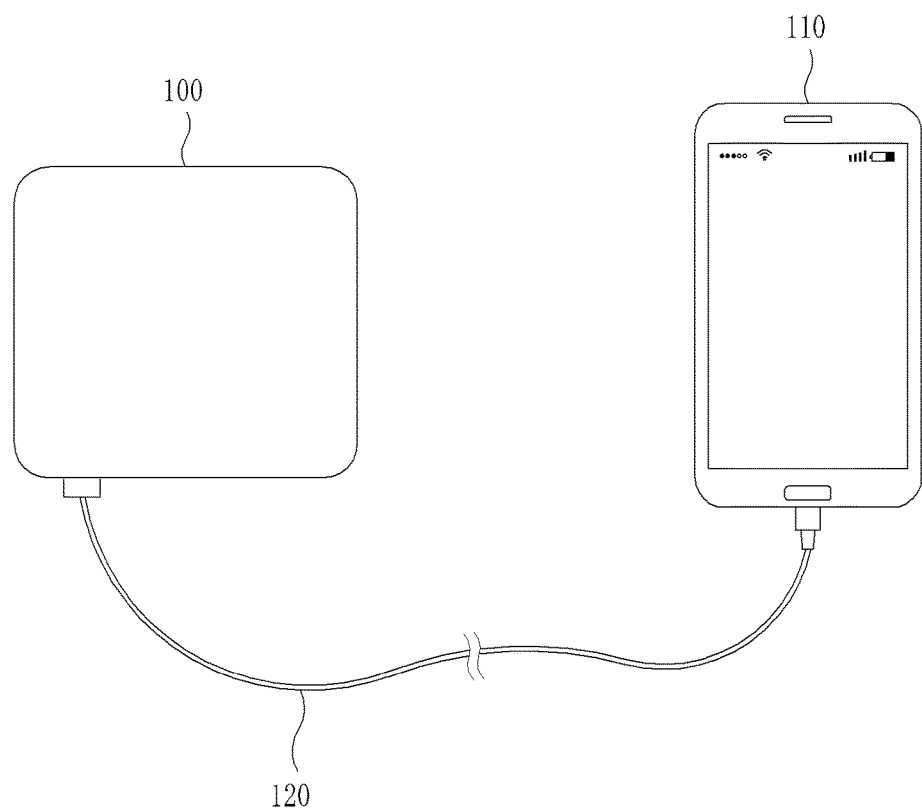
FIG. 1 is a drawing schematically illustrating an input/output system for a set-top box using a terminal, according to an exemplary embodiment.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. In the drawings, the shapes and sizes of elements may be exaggerated for clarity.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein Exemplary embodiments of the inventive concept may provide a technique on an input/output system and a method for a set-top box using a terminal, and, more particularly, provide an input/output system and a method for a set-top box using a terminal, capable of making bidirectional communication based on Android Debug Bridge (ADB), Media Transfer Protocol (MTP), or Picture Transfer Protocol (PTP), capable of connecting the terminal with the set-top box, from which an output device is absent, and using the terminal as the output device, and capable of connecting the terminal with the set-top box, from which an input device is absent, and using the terminal as the input device.

The terminal may be USB-connected with the set-top box based on the ADB, the MTP, or the PTP and be used as an output device and/or an input device. In this case, when an application (or app) to execute the ADB, the MTP, or the PTP is absent, after an install file or an install guide file is stored at an arbitrary location of the terminal, the terminal may easily receive a service through minimum confirmation.

The terminal may make communication based on a universal serial bus (USB) standard protocol. Accordingly, a system may be configured to allow the set-top box, from which a display unit or an input device is absent, to support the USB standard protocol, thereby connecting the terminal with the set-top box through a simple configuration and a simple scheme. Therefore, the terminal may be used as an input device and/or output device for the set-top box.

FIG. 1 is a drawing schematically illustrating an input/output system for a set-top box using a terminal, according to an exemplary embodiment.

Referring to FIG. 1, according to an exemplary embodiment, the input/output system for the set-top box using the terminal may include a set-top box 100 and a terminal 110 connected with the set-top box 100 to provide input/output.

The set-top box 100 may include a communication unit to make wired or wireless communication with the terminal and a control unit to determine whether the terminal is in a receive enable state for image data or audio data, to determine whether to be in a receive enable state for user input data from the terminal, to share the image data or the audio data with the terminal by transmitting the image data or the audio data to the terminal when the terminal is in the receive enable state for the image data or the audio data, and to receive touch coordinates or a keypad input value input by a user when the set-top box is in the receive enable state for the user input data from the terminal.

The terminal 110 may include a communication unit connected with the communication unit of the set-top box to make wired or wireless communication, a display unit to receive the touch coordinates or the keypad input value input by the user, to receive an image from the set-top box, and to output the image, a speaker to receive audio from the set-top box and to output the audio, and a control unit to output the image and the audio, which are received from the set-top box, in real time through an application, and to receive an install file or an install guide file of an application from the set-top box, and to guide the installation of the application when an application, which receives the image data or the audio data, is not previously installed on the terminal.

Hereinafter, each element of the input/output system for the set-top box using the terminal according to an exemplary embodiment will be described in more detail.

The set-top box 100 may be connected with an external display device to appropriately convert a signal output from the outside and to display a converted signal on the external display device. In this case, the set-top box 100 may be a device from which a display or a speaker is absent. Therefore, the set-top box may not output an image and/or audio on its own. In addition, the set-top box 100 may be an electrical/electronic device from which an input unit, such as a touch screen, a virtual keypad, or a keypad, is absent.

In general, the set-top box 100 may refer to a receiving device for digital satellite broadcast, and may be connected with a television, which is one of display devices, to receive digital broadcast. The set-top box 100 may include not only the receiving device for the digital satellite broadcast, but also an electrical/electronic device, from which a display unit is absent, or limitedly including a display unit.

For example, the set-top box 100 may include various electrical/electronic devices such as a receiving device for digital satellite broadcast, an over the top (OTT) device, a router, a water purifier and a boiler, which require a safety check, a home appliance, a vehicle multimedia system, and a traffic signal control system.

Meanwhile, the display device may include the terminal 110, such as a smart phone, to perform an input operation and/or an output operation and to perform various functions provided by the set-top box 100.

The terminal 110 may receive a signal from the set-top box 100 to output an image (screen image) and sound (audio) through a display unit and a speaker, respectively, and may transmit the input of a user to the set-top box 100 through an input device such as the display unit. In this case, the input device using the terminal 110 may be a keypad, a touch pad, a mouse, a gyro sensor, a camera, and the like as well as the display unit.

The terminal 110, which serves as an electronic device, may be a stationary terminal or a mobile terminal realized by a computer device. For example, the terminal 110 may include a smart phone, a cellular phone, a navigation device, a notebook, a tablet device, a digital broadcast terminal, a personal digital assistant (PDA), a portable multimedia player (PMP), and an e-book reader.

In addition, a device or a communication system to wired- or wireless-connect the set-top box 100 and the terminal 110 with each other may be used.

For example, the set-top box 100 and the terminal 110 may be formed therein with respective USB ports and wired-connected with each other through a USB cable 120 in wire. When the set-top box 100 and the terminal 110 are connected with each other via the USB cable 120 in wire, a necessary service may be provided through a simple configuration and a simple scheme based on a communication protocol to support an integrated data field that a terminal and a device are connected with each other.

For example, as the set-top box 100 and the terminal 110 are USB-connected with each other based on an ADB, an MTP, or a PTP, the terminal 110 may be used as an input device and/or an output device. In this case, a connection mode, such as an MTP mode or a PTP mode, may be selected through the display unit of the terminal 110, and image (screen image) data and audio (e.g., voice) data provided by the set-top box 100 may be mirrored to the terminal 110 in real time.

The ADB, which is a communication protocol to transmit an instruction to an Android terminal and to receive a result, may refer to a program to issue instructions to an Android operating system device.

The MTP and the PTP are connection schemes that help file transfer by connecting the terminal with a device such as a computer.

A device employing an independent file system may be recognized based on the ADB, the MTP, or the PTP without the use of a compatible file system or software.

Since the terminal 110 makes communication based on the USB standard protocol as described above, when the system is configured to allow the set-top box 100, from which a display unit or an input device is absent, to support the USB standard protocol, the terminal 110 may be used as an input device and/or output device.

According to another example, the set-top box 100 and the terminal 110 may include respective wireless communication modules to be connected with each other through wireless communication.

As described above, communication schemes are not limited. A wireless communication scheme may include not only a communication scheme to utilize a telecommunication network (for example, a mobile communication network, wired Internet, wireless Internet, and a broadcast network), but also a short-range radio communication scheme between devices. For example, the network may randomly include at least one of a personal area network (PAN), a local area network (LAN), a campus area network (CAN), a metropolitan area network (MAN), a wide area network (WAN), and a broadband network (BBN). In addition, the network may randomly include at least one of network topologies including a bus network, a star network, a ring network, a mesh network, a star bus network, and a tree or hierarchical network, but the inventive concept is not limited thereto.

Therefore, the set-top box 100 and the terminal 110 may interwork with each other. In this case, the interworking between the set-top box 100 and the terminal 110 may refer to that the set-top box 100 and the terminal 110 make communication with each other to display content, which is received in the set-top box 100, on the terminal 110 including the display unit, or to transmit a direction, such as control or selection, which is received by a user, from the terminal 110 to the set-top box 100.

Figure 2:
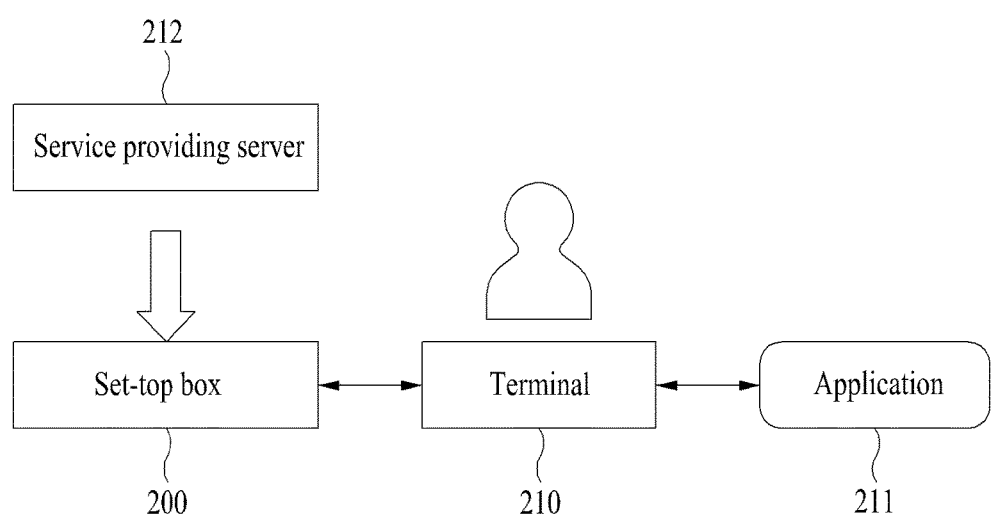
FIG. 2 is a diagram to explain a service providing system of an input/output system for a set-top box using a terminal, according to an exemplary embodiment.

FIG. 2 is a diagram to explain a service providing system of the input/output system for the set-top box using the terminal, according to an exemplary embodiment.

Referring to FIG. 2, the input/output system for the set-top box using the terminal may include a set-top box 200 and a terminal 210 connected with the set-top box 200 to perform input and output operations. According to an exemplary embodiment, the input/output system for the set-top box using the terminal may further include a service providing server 212 to provide content to the set-top box 200.

The set-top box 100 may be connected with an external display device to appropriately convert an external input signal and to display the converted external input signal on the external display device.

In this case, the external display device may include the terminal 210, such as a smart phone, to perform an input operation and/or an output operation and to perform various functions provided by the set-top box 200.

The terminal 210 may receive a signal from the set-top box 200 to output an image, a voice, or the like on a display unit. The terminal 210 may transmit the input by a user, which is received through an input device such as the display unit, to the set-top box 200.

In this case, the terminal 210 may receive a signal from the set-top box 200 through an application 211, which receives and outputs image data or audio data, and may output the image, the audio, or the like on the display unit. In addition, the terminal 210 may transmit the input of the user, which is received through the input device such as the display unit, to the set-top box 200 using the application 211.

When the application 211, which receives and outputs the image data or the audio data, is absent from the terminal 210, an install file or an install guide file of the application 211 may be provided by the set-top box 200. In this case, the set-top box 200 may provide the install file or the install guide file of the application 211, and may guide the installation of the application 211 through an external server which is separately provided.

In this case, the server may be realized by a computer device or a plurality of computer devices that make communication with the terminal 210 via a network to provide instructions, codes, files, contents, services, and the like. For example, the server may provide the install file of the application 211 for the terminal 210 accessing the server via the network. In this case, the terminal 210 may install the application 211 using the install file provided by the server. In addition, the terminal 210 may access the server under the control of an operating system (OS) and at least one program (for example, a browser or an installed application), which are included in the terminal 210, to receive services or contents provided by the server.

Meanwhile, according to an exemplary embodiment, the input/output system for the set-top box using the terminal may further include the service providing server 212. The service providing server 212 may provide content to be reproduced by the set-top box 200 accessing the service providing server 212 via the network. In this case, the contents provided by the service providing server 212 may include broadcast contents, but the inventive concept is not limited thereto. In other words, the contents may include all contents sufficient to be displayed on the display unit of the terminal 210.

When the set-top box 200 has a smart function, the content may include a web page, a video on-demand (VOD), a game, and other contents related to various services for the smart function.

Figure 3:
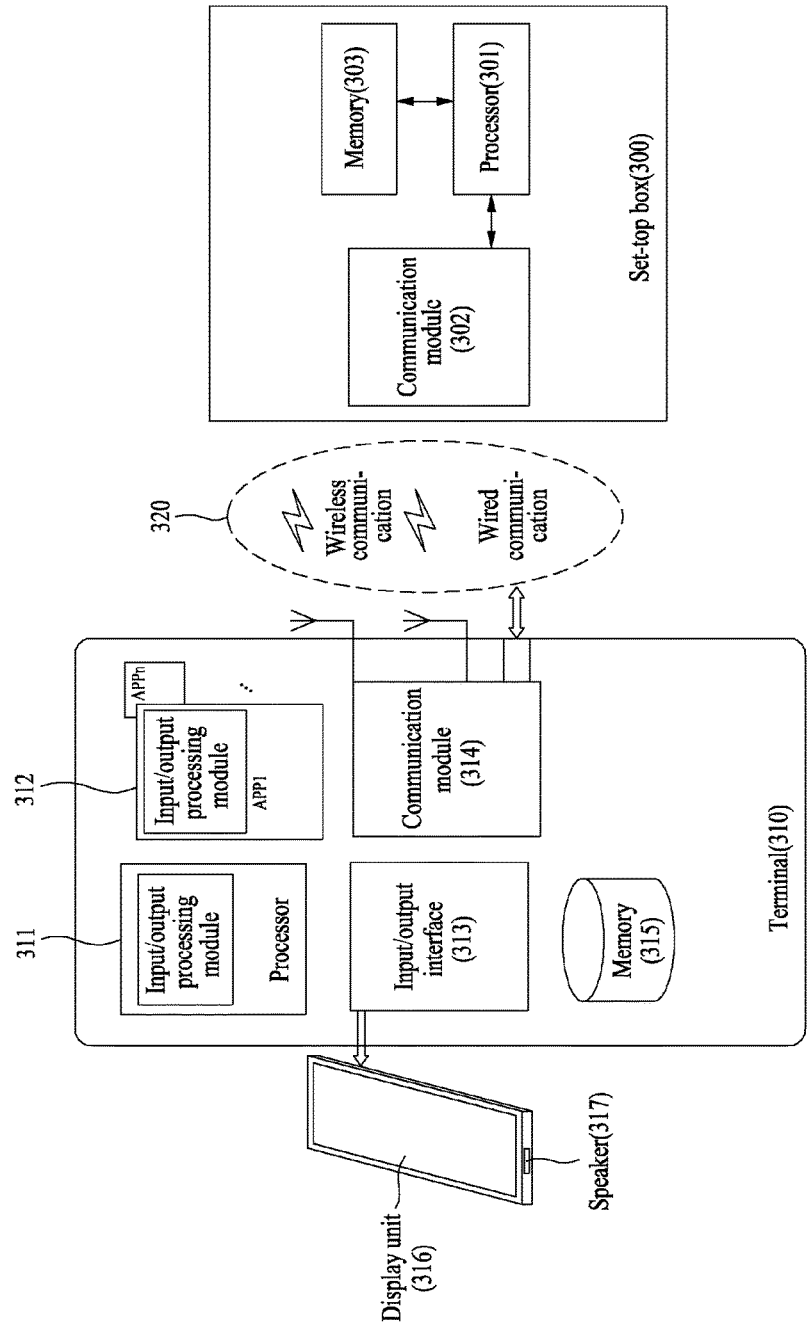
FIG. 3 is a diagram illustrating the configuration of an input/output system for a set-top box using a terminal, according to an exemplary embodiment.

FIG. 3 is a diagram illustrating the configuration of an input/output system for a set-top box using a terminal, according to an exemplary embodiment;

Referring to FIG. 3, the input/output system for the set-top box using the terminal according to an exemplary embodiment may include a set-top box and the terminal as described above.

As the set-top box has neither a display unit nor a speaker, or limitedly has the display unit and the speaker, the set-top box may output various contents such as an image and a voice through the terminal including a display unit and a speaker. In addition, as the set-top box has no input unit, which receives the input of a user, or limitedly has the input unit, the set-top box may receive the input of the user from the terminal.

Furthermore, as the terminal is used as an input/output device, the set-top box may provide various functions through an application. The functions will be described in more detail below.

Hereinafter, the internal configurations of a set-top box 300 and a terminal 310 serving as examples of one set-top box and one terminal will be described with reference to FIG. 3.

The terminal 310 may include, for example, a processor 311, an input/output interface 313, a communication module 314, a memory 315, and a display unit 316. The terminal 310 may include at least one of applications running on the processor 311 and the terminal 310. At least one of the processor 311 and/or the applications may include an input/output processing module.

The set-top box 300 and the terminal 310 may include memories 303 and 315, processors 301 and 311, communication modules 302 and 314, and an input/output interface 313.

The memories 303 and 315 may include a random access memory (RAM), a read only memory (ROM), and a program massage storage such as a disk drive, which are computer-readable recording media. In addition, the memories 303 and 315 may store an operating system and at least one program code (for example, codes for a browser or the above-described application installed or run on the terminal 310). The software elements may be loaded from computer-readable recording media provided separately from the memories 303 and 315 using a drive mechanism. Such computer-readable recording media may include a floppy drive, a disk, a tape, a DVD/CD-ROM drive, or a memory card. According to another exemplary embodiment, the software elements may be loaded into the memories 303 and 315 through the communication modules 302 and 314 instead of the computer readable recording media. For example, at least one program may be loaded into the memories 303 and 315 based on programs (for example, the above-described application) installed through files provided by developers or file distribution systems (for example, the above-described server or the set-top box 300), which distributes install files of applications, via a network.

The processors 301 and 311 may be configured to process instructions of a computer program by performing basic arithmetic, logic, and I/O operations. The instructions may be provided to the processors 301 and 311 through the memories 303 and 315 or the communication modules 302 and 314. For example, the processors 301 and 311 may be configured to execute the received instructions based on program codes stored in recording devices such as the memories 303 and 315.

The communication modules 302 and 314 may provide functions of allowing the terminal 310 and the set-top box 300 to make communication with each other or to make communication with another terminal or another set-top box via a network 320. For example, a request created by the processor 311 of the terminal 310 based on the program code stored in a recording device, such as the memory 315, may be transmitted to the set-top box 300 via the network 320 under the control of the communication module 314. In addition, a control signal, an instruction, content, or a file, which is provided under the control of the processor 301 of the set-top box 300, may be received in the terminal 310 through the communication module 314 of the terminal 310 after passing through a communication module 302 and the network 320. For example, the control signal or the instruction of the set-top box 300 received through the communication module 314 may be transmitted to the processor 311 or the memory 315, and the content or the file may be stored in a storage medium which may be further included in the terminal 310.

The input/output interface 313 may be a unit to interface with the input/output device. For example, the input device may include a device such as a keyboard or a mouse, and the output device may include a device such as a display device to display a communication session of an application. According to another example, the input/output interface 313 may be a unit to interface with a device, such as a touch screen, having an integrated input/output function. In more detail, the processor 311 of the terminal 310 may display or output a service screen image or content, which is formed based on data provided by the set-top box 300 and another terminal, on the display unit 316 or from the speaker 317 through the input/output interface 313, when processing an instruction of a computer program loaded into the memory 315.

According to other exemplary embodiments, the terminal 310 and the set-top box 300 may include more elements than those of FIG. 3. However, all elements according to the related art need not be clearly illustrated. For example, the terminal 310 may be realized to include at least part of the input/output devices or may further include other elements such as a transceiver, a global positioning system (GPS) module, a camera, various sensors, and a database.

Figure 4:
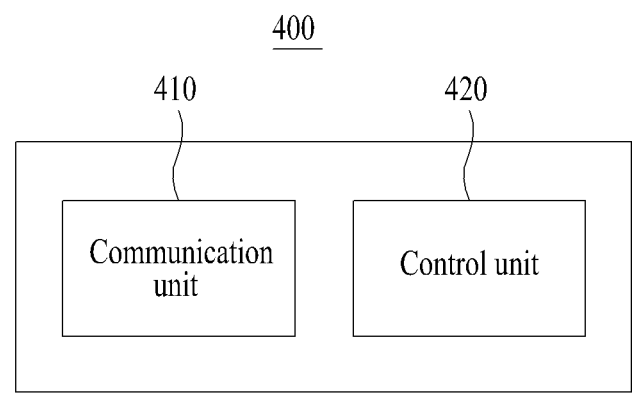
FIG. 4 is a block diagram to explain the configuration of a set-top box, according to an exemplary embodiment.

FIG. 4 is a block diagram to explain the configuration of a set-top box, according to an exemplary embodiment.

Referring to FIG. 4, according to an exemplary embodiment, in an input/output system for a set-top box using a terminal, a set-top box 400 may include a communication unit 410 and a control unit 420. According to an exemplary embodiment, the set-top box 400 may further include a storage unit.

The communication unit 410 may be connected with a terminal including a display unit or a speaker through wired or wireless communication.

The communication unit 410 is formed therein with a USB port to support a USB standard protocol. Therefore, as a USB port of the terminal and the USB port of the set-top box 400 are connected with each other through a USB cable, the communication unit 410 may make wired communication with the terminal to support the MTP or the PTP mode at the terminal.

The communication unit 410 includes a wireless communication module. Therefore, as a wireless communication module of the terminal is connected with the wireless communication module of the set-top box 400 through at least one of Bluetooth, near field communication (NFC), and Wi-Fi, the communication unit 410 may make wireless communication with the terminal to support the MTP mode or the PTP mode at the terminal.

The control unit 420 determines whether the terminal is in a receive enable state for image data or audio data. When the terminal is in the receive enable state for the image data or the audio data, the control unit 420 may share the data with the terminal by transmitting the image data or the audio data to output an image through a display unit of the terminal or to output audio through a speaker of the terminal.

The control unit 420 may include elements of a determination unit, a data outputting unit, an input processing unit, a signal processing unit, and a change detecting unit.

In this case, the determination unit, the data outputting unit, the input processing unit, the signal processing unit, and the change detecting unit may be elements of the processor of the set-top box 400, and the control unit 420 may control the at least one of the processors.

Figure 5:
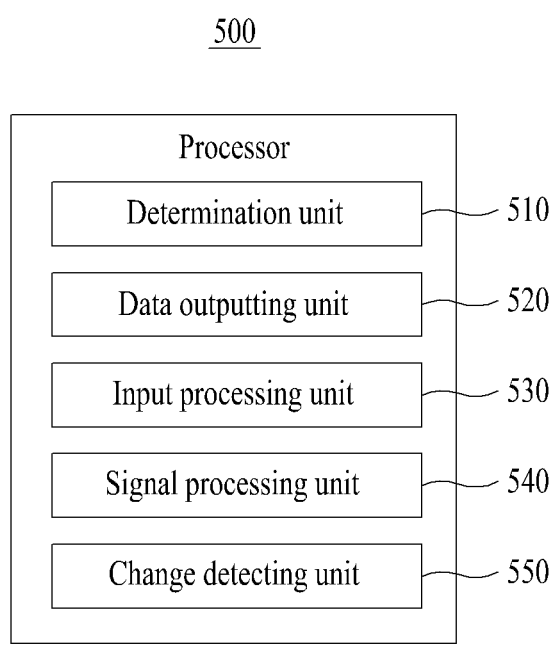
FIG. 5 is a block diagram to explain the configuration of a control unit of a set-top box, according to an exemplary embodiment.

FIG. 5 is a block diagram to explain the configuration of a control unit of a set-top box, according to an exemplary embodiment;

Referring to FIG. 5, according to an exemplary embodiment, in the input/output system for the set-top box using the terminal, a control unit of a set-top box 500 may include elements of a determination unit 510, a data outputting unit 520, and an input processing unit 530. According to an exemplary embodiment, the control unit of the set-top box 500 may further include a signal processing unit 540 and a change detecting unit 550.

The determination unit 510, the data outputting unit 520, the input processing unit 530, the signal processing unit 540, and the change detecting unit 550 may be elements of a processor of the set-top box 500. In this case, the processor and the elements of the processor may be realized to execute instructions based on codes of an operating system and at least one program included in a memory. In this case, the elements of the processor may be expressions of mutually different functions performed by the processor. The processor may load program codes, which are stored in the form of a program file for the input/output processing method, into the memory.

The determination unit 510 may determine whether the terminal is in a receive enable state for image data or audio data. In addition, the determination unit 510 may determine whether the set-top box is in a receive enable state for user input data from the terminal.

When the terminal is in the receive enable state for the image data or the audio data, the data outputting unit 520 may share the data with the terminal by transmitting the image data or the audio data to output the image through the display unit of the terminal or to output the audio through the speaker of the terminal.

The data outputting unit 520 may output the image data transmitted from the set-top box 500, from which a display unit is absent, through a display unit of the terminal in real time, or may output the audio data transmitted from the set-top box 500, from which a speaker is absent, through the speaker of the terminal in real time.

The input processing unit 530 may receive touch coordinates or a keypad input value, which is input by a user through the display unit of the terminal, when the set-top box is in the receive enable state for user input data from the terminal.

The input processing unit 530 may allow the set-top box 500 to receive the touch coordinates or the keypad input value which is input by the user through the display unit of the terminal.

The signal processing unit 540 may convert a content signal received from a service providing server into image data or audio data to be displayed or output. In this case, the communication unit may receive the content signal as the service providing server and the communication unit are connected with each other through the wireless communication.

The change detecting unit 550 may transmit information to output changed image data or changed audio data through the display unit of the terminal or the speaker of the terminal or to input changed user input data into the input processing unit 530 to process the changed user input data, when the shared data is changed as a call back system to detect data change is employed in a case that communication protocol connection, which transmits an instruction and receives a result, is available in the terminal.

Therefore, as the set-top box, from which an output device is absent, is connected with the terminal based on the ADB, the MTP, the PTP, and wireless communication, the terminal may be used as the output device. In addition, as the set-top box, from which an input device is absent, is connected with the terminal based on the ADB, the MTP, or the PTP through wireless communication, the terminal may be used as an input device.

Figure 6:
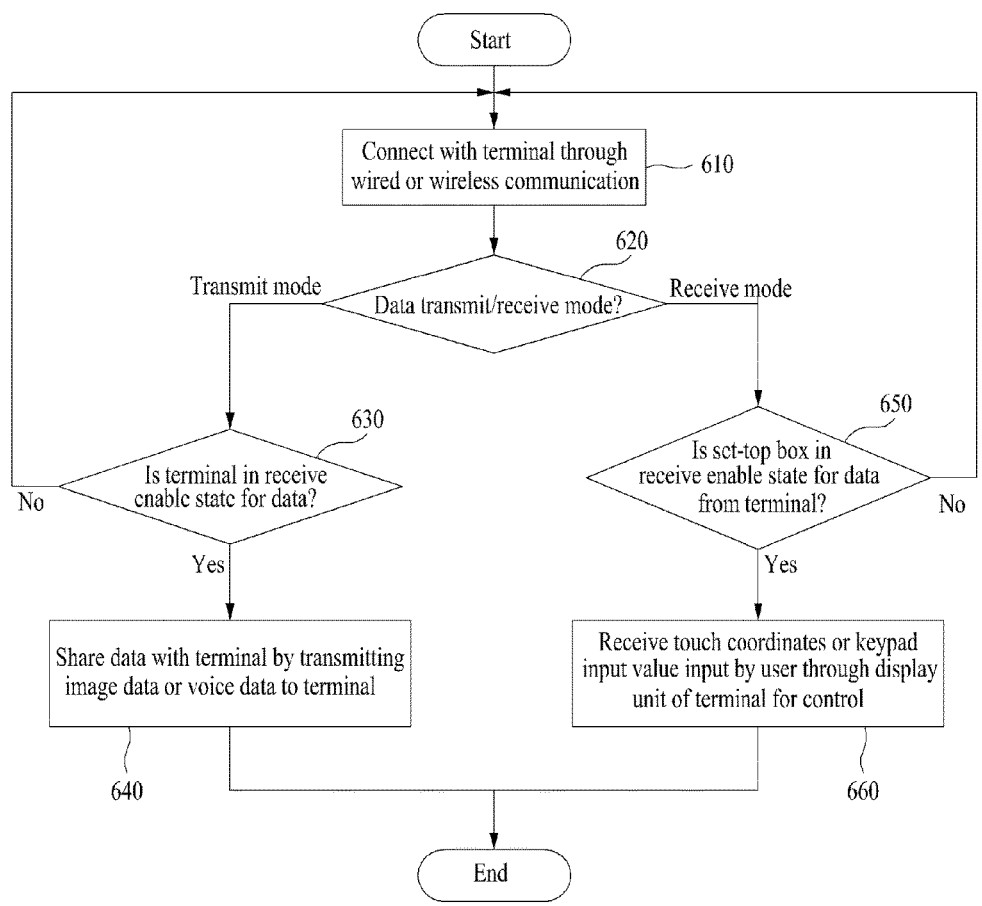
FIG. 6 is a flowchart to explain an input/output method for a set-top box using a terminal, according to an exemplary embodiment.

FIG. 6 is a flowchart to explain an input/output method for a set-top box using a terminal, according to an exemplary embodiment.

Referring to FIG. 6, according to an exemplary embodiment, the input/output method for the set-top box using the terminal includes making connection with a terminal including a display unit or a speaker through wired or wireless communication (step 610), determining whether the terminal is in a receive enable state for image data or audio data (step 630), and sharing the image data or the audio data with the terminal by transmitting the image data or the audio data to the terminal to output the image data through the display unit of the terminal or to output the audio data through the speaker of the terminal, when the terminal is in the receive enable state for the image data or the audio data (step 640).

In addition, according to an exemplary embodiment, the input/output method for the set-top box using the terminal further includes determining whether the set-top box is in a receive enable state for user input data from the terminal (step 650) and receiving touch coordinates or a keypad input value, which is input by a user through the display unit of the terminal, for control the set-top box, when the set-top box is in the receive enable state for the user input data from the terminal (step 660).

Hereinafter, an example of making a USB connection in an MTP mode in an Android terminal will be described.

The set-top box (or a cloud-based thin client device ("cloud-based box"), hereinafter, collectively referred to as a set-top box for the convenience of explanation) and the terminal may share document, app install, and input and output files based on the MTP, the PTP, and the ADB. In other words, the set-top box and the terminal may share the same file.

For example, when an ADB connection is available in the terminal, the set-top box and the terminal may employ a call back system to detect a file change. When the shared file is changed, the set-top box or the terminal may execute screen image displaying, input processing, app installing, or document viewing by using relevant information.

In addition, when the ADB connection is not available in the terminal, the app installing may be guided. For example, the set-top box may guide the installation of a client system in the terminal through a voice, a document, or the like.

After the app is installed, as an MTP file is shared, communication may be made and relevant operations may be performed with respect to input and output devices for image and audio data between devices.

Therefore, according to an exemplary embodiment, in the input/output method for the set-top box using the terminal, communication may be made based on the USB standard protocol of the terminal. Accordingly, the set-top box, from which a display unit or an input device is absent, supports the USB standard protocol to use the terminal as an input/output device.

Hereinafter, the input/output method for the set-top box using the terminal according to an exemplary embodiment will be described in more detail by using the input/output system for the set-top box using the terminal according to an exemplary embodiment, which has been described with references FIGS. 4 and 5. As shown in FIG. 4, according to an exemplary embodiment, in the input/output system for the set-top box using the terminal, the set-top box 400 may include the communication unit 410 and the control unit 420. As shown in FIG. 5, the control unit of the set-top box 500 includes the determination unit 510, the data outputting unit 520, the input processing unit 530, the signal processing unit 540, and the change detecting unit 550.

In the step 610, the communication unit may be connected with the terminal including the display unit or the speaker through wired or wireless communication.

For example, the communication unit may make wired communication with the terminal based on the USB standard protocol as the USB port of the terminal and the USB port of the set-top box are connected with each other through the USB cable, which supports the MTP mode or the PTP mode at the terminal.

In more detail, the set-top box and the terminal may be formed therein with respective USB ports to be connected with each other through a USB cable. Accordingly, when the set-top box and the terminal may be connected with each other through the USB cable, a necessary service may be provided through a simple configuration and a simple scheme based on a communication protocol to support an integration data field that the set-top box and the terminal are connected with each other.

For example, the terminal may be used as an input device and/or output device as the set-top box and the terminal are USB-connected with each other based on the ADB, the MTP, the PTP or the like. In this case, a connection mode, such as an MTP mode or a PTP mode, may be selected through the display unit of the terminal, and image (screen image) and audio (e.g., voice) data provided by the set-top box may be transmitted to the terminal in real time.

According to another example, the communication unit may make wireless communication with the terminal as a wireless communication module of the terminal is connected with a wireless communication module of the set-top box through at least one of Bluetooth, near field communication (NFC), and Wi-Fi.

In this case, the wireless communication scheme of the communication unit is not limited. The wireless communication scheme may include not only a communication scheme utilizing a telecommunication network (for example, a mobile communication network, a wired Internet, a wireless Internet, and a broadcast network), but also a short-range radio communication scheme between devices. For example, the network may randomly include at least one of a PAN, a LAN, a CAN, a MAN, a WAN, and a BBN. In addition, the network may randomly include at least one of network topologies including a bus network, a star network, a ring network, a mesh network, a star bus network, and a tree or hierarchical network, but the inventive concept is not limited thereto.

Therefore, the set-top box and the terminal make wired or wireless communication with each other to display content, which is received in the set-top box, on a terminal including the display unit, and to transmit directions, such as control and selection, which are input by a user, from the terminal to the set-top box.

In the step 630, the determination unit may determine whether the terminal is in a receive enable state for image data or audio data. In this case, the image data or the audio data, which is content to be output from the set-top box through the terminal, may include an image, a video (screen), audio (e.g., voice), or a screen including applications.

For example, the determination unit may determine whether an application, which receives and outputs image data or audio data, is installed on the terminal. In this case, the determination unit may guide the terminal to receive an install file or an install guide file of the application from the set-top box and to install the application when an application, which receives and outputs the image data or the audio data, is not installed on the terminal. For example, if the ADB connection is not used in the terminal, the set-top box may guide the terminal to install an application, such as a client system, through a voice, a document, or the like. Thereafter, the determination unit may determine whether the terminal is in the receive enable state for the image data or the audio data by executing the application installed on the terminal.

In the step 640, when the terminal is in the receive enable state for the image data or the audio data, the data outputting unit may share the image data or the audio with the terminal by transmitting the image data or the audio data to the terminal to output the image data through the display unit of the terminal or to output the audio data through the speaker of the terminal.

In addition, according to an exemplary embodiment, the input/output method for the set-top box using the terminal may further include determining whether the set-top box is in the receive enable state for user input data from the terminal (step 650) and receiving touch coordinates or a keypad input value, which is input by a user through the display unit of the terminal, for control the set-top box (step 660).

Meanwhile, after wired or wireless communication is made with the terminal including the display unit or the speaker by the communication unit (step 610), whether a mode of the set-top box is a transmit mode or a receive mode may be determined (step 620). In other words, in step 620, the determination unit may determine whether the mode of the set-top box is the transmit mode or the receive mode. In this case, when the mode of the set-top box is determined as being the transmit mode, the determination unit may determine whether the terminal is the receive enable state for the image data or the audio data (step 630). When the mode of the set-top box mode is determined as being the receive mode, the determination unit may determine whether the set-top box is in a receive enable state for user input data from the terminal.

In step 650, the determination unit may determine whether the set-top box is in the receive enable state for the user input data from the terminal.

For example, the determination unit may determine whether the application for the input of the user input data is installed on the terminal. In this case, when the application, which inputs the user input data, is not previously installed on the terminal, the determination unit may provide the install file or the install guide file of the application from the set-top box and may guide the installation of the application. In this case, the install file of the application may be provided from an external server as well as the set-top box. Thereafter, the determination unit may execute the application installed on the terminal to determine the input enable state for the user input data.

In the step 660, the input processing unit may receive and control the touch coordinates or the keypad input value which is input by the user through the display unit of the terminal when the set-top box is in the receive enable state for the user input data from the terminal. In this case, the touch coordinates or the keypad input value input by the user may be a coordinate value or an input value obtained through a touch screen, a virtual keypad, or a keypad. In addition, the input device of the terminal may be a keypad, a touch pad, a mouse, a gyro sensor, or a camera as well as a display.

Meanwhile, in the case that communication protocol connection, which transmits an instruction and receives a result, is available in the terminal, a call back system to detect data change is applied. Therefore, when shared data are changed, changed image data or changed audio data may be displayed on the display unit of the terminal or the changed user input data may be input to the set-top box and processed.

Accordingly, an image transmitted from the set-top box, from which a display unit is absent, may be displayed on the display unit of the terminal in real time, or audio transmitted from the set-top box, from which a speaker is absent, may be output through the speaker of the terminal in real time. In addition, the touch coordinates or the keypad input value input by the user through the display unit of the terminal may be received in the set-top box.

Hereinafter, an example to explain the input/output system and the method for the set-top box using the terminal according to an exemplary embodiment will be described.

The input/output system and the method for the set-top box using the terminal may be applied to various technical fields, and the inventive concept is not limited to following several examples of the input/output system and the method for the set-top box using the terminal.

For example, according to the input/output method for the set-top box using the terminal, connection is made with a terminal including a display unit or a speaker through wired or wireless communication, and whether the terminal is in the receive enable state for image data or audio data is determined. When the terminal is in the receive enable state for the image data or the audio data, the image data or the audio data is transmitted to the terminal and shared with the terminal to output the image data through the display unit of the terminal or to output the audio data through the speaker of the terminal.

In this case, the set-top box may constitute at least a part of an electronic device requiring inspection. In order to share data with the terminal, a management menu of the electronic device requiring the inspection is displayed on the display unit through an application previously installed on the terminal, and selection coordinates of an inspection menu input by the user are received.

Thereafter, the electronic device requiring the inspection is inspected with respect to a menu corresponding to the received selection coordinates. In this case, even though the inspection of the electronic device, from which a display is absent, is performed only by a specialist, the inspection using the terminal may be performed by a non-specialist as well as the specialist.

After the inspection is performed, an inspection result may be transmitted to the terminal to be displayed on the display unit of the terminal.

In more detail, to manage a water purifier or a boiler, a user may connect the water purifier or the boiler, from which a display unit is absent, with the terminal through a USB cable. When the water purifier or the boiler is connected with the terminal, a screen image of a water purifier management menu or a boiler management menu may be transmitted to the terminal from the water purifier or the boiler.

When the user selects an inspection menu from the screen image of the water purifier management menu or the boiler management menu at the terminal, the terminal may transmit the coordinates of the selected inspection menu to the water purifier or the boiler. In this case, the water purifier or the boiler may be inspected with respect to the inspection menu corresponding to the received coordinates and may transmit an inspection result to a terminal screen.

According to another example, the set-top box may constitute at least a part of a traffic signal control system.

For the share of data with the terminal, a control menu of the traffic signal control system may be displayed on the display unit of the terminal through an application which is previously installed on the terminal. Accordingly, selection coordinates of the control menu, which are input by the user, may be received in the set-top box. Thereafter, the traffic signal control system may be controlled based on the received selection coordinates.

In more detail, for the manual management of the traffic signal control system, the police may USB-connect the terminal with the traffic signal control system in traffic congestion time. Accordingly, the traffic signal control system may transmit a screen image for traffic signal control to the terminal, and an input of the terminal may be transmitted to the traffic signal control system.

In this case, costs and power may be more saved as compared to the case that an input/output device is additionally mounted in a traffic signal control system near to traffic signals.

According to another example, the set-top box may constitute at least a part of a cloud-based box provided on a café table.

A user may connect the cloud-based box, from which a display is absent, on the café table, with a terminal of a user through a USB cable and then may establish a communication channel. In this case, the cloud-based box may be a device, from which a display or a speaker is absent, so that the output of an image and/or audio is difficult, or an electrical/electronic device from which an input unit such as a touch screen, a virtual keypad, or a keypad is absent.

When the cloud-based box is connected with the terminal, the cloud-based box may transmit a screen image, which is related to terminal charging, a drink order, payment for the drink, listening to music, or image viewing, to the terminal.

The user may select a service through a touch screen for the screen image transmitted to the terminal, and the terminal may transmit an event or coordinates input onto the touch screen to the cloud-based box.

The cloud-based box may run a menu corresponding to the coordinates, which are received from the terminal, and then may transmit a running result of the menu to the terminal. The cloud-based box may provide convenience functions using the screen of the terminal instead of installing an additional application in the terminal while performing the terminal charging function, in a standby state.

According to another example, the set-top box may constitute at least a part of a multimedia system of a vehicle.

To update the multimedia system of the vehicle, a user may connect the multimedia system of the vehicle with the terminal through a USB cable.

The multimedia system of the vehicle may transmit a download instruction of multimedia software (SW) to the terminal.

Then, the terminal may download an SW update package thereto through data communication. When the download of the SW update package is finished, the SW update package downloaded to the terminal may be transmitted to the multimedia system of the vehicle, thereby upgrading the multimedia system of the vehicle.

Figure 7:
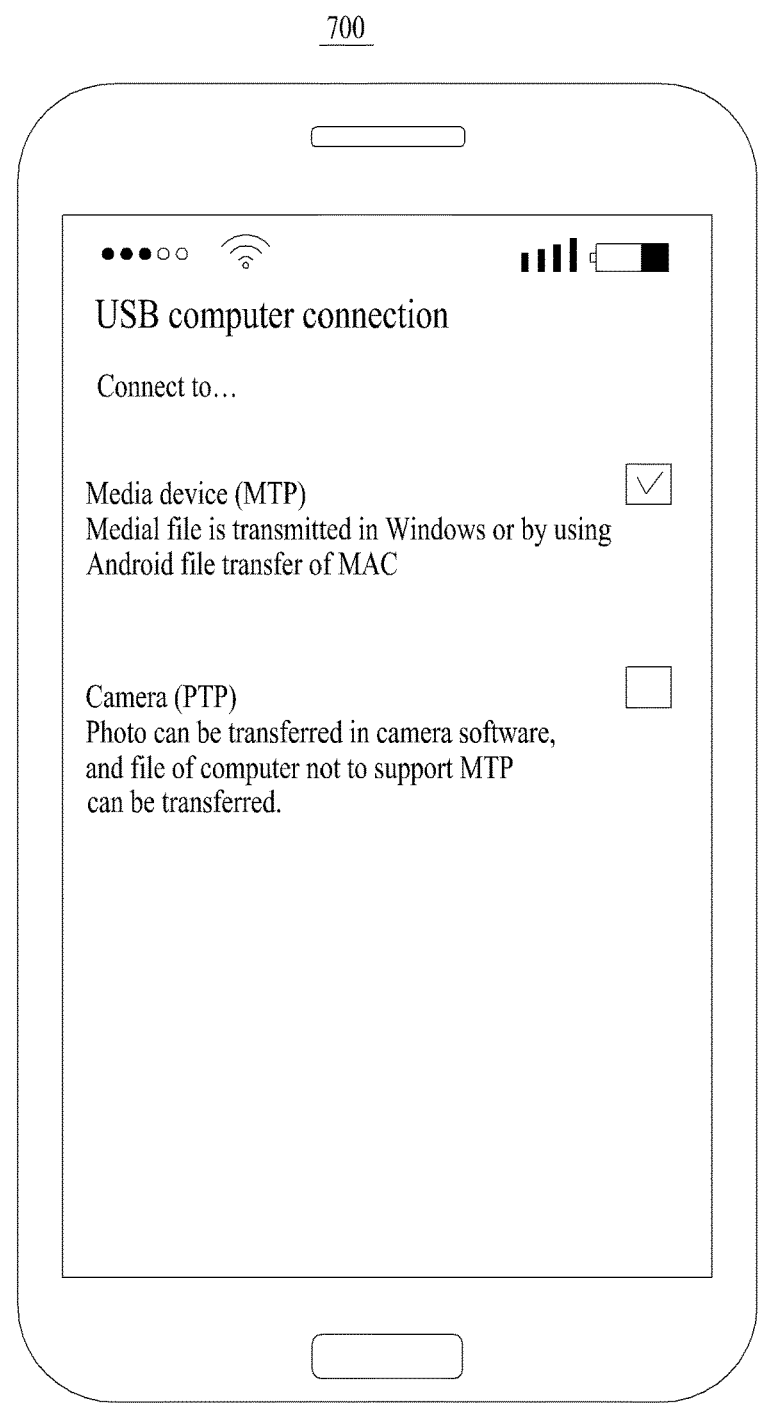
FIG. 7 is a drawing illustrating an example of a screen image for USB connection mode setting of a terminal, according to an exemplary embodiment.

FIG. 7 is a drawing illustrating an example of a screen image for USB connection mode setting of a terminal, according to an exemplary embodiment.

Referring to FIG. 7, a set-top box may be connected with the terminal through a USB cable. When the set-top box is connected with the terminal through the USB cable, a necessary service may be received through a simple configuration and a simple scheme based on a communication protocol to support an integrated data area where the terminal and a device are connected with each other.

For example, the set-top box may be USB-connected with the terminal based on the ADB, the MTP, or the PTP to use a display unit of the terminal as an input device and/or an output device. In this case, the connection mode, such as the MTP mode or the PTP mode, may be selected through the display unit of the terminal, and a video (screen image) or audio (e.g., voice) data provided by the set-top box may be transmitted to the terminal in real time.

As described above, the terminal may make communication based on a USB standard protocol. Accordingly, when the system may be configured to allow the set-top box, from which a display unit or an input device is absent, to support the USB standard protocol, the terminal may be used as an input and/or output device.

The foregoing devices may be realized by hardware elements, software elements and/or combinations thereof. For example, the devices and elements illustrated in exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Alternatively, the processing unit may have a different processing configuration, such as a parallel processor.

Software may include computer programs, codes, instructions or one or more combinations thereof and configure a processing unit to operate in a desired manner or independently or collectively control the processing unit. Software and/or data may be permanently or temporarily embodied in any type of machine, elements, physical equipment, virtual equipment, computer storage media or units or transmitted signal waves so as to be interpreted by the processing unit or to provide instructions or data to the processing unit. Software may be dispersed throughout computer systems connected via networks and be stored or executed in a dispersion manner. Software and data may be recorded in one or more computer-readable storage media.

The methods according to the above-described exemplary embodiments of the inventive concept may be recorded in computer-readable media including program instructions to implement various operations embodied by a computer. The media may also include, alone or in combination with the program instructions, data files, data structures, and the like. The program instructions recorded in the media may be designed and configured specially for exemplary embodiments of the inventive concept or be known and available to those skilled in computer software. Computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Program instructions include both machine code, such as produced by a compiler, and files containing higher level code that may be executed by the computer using an interpreter. The described hardware devices may be configured to act as one or more software modules to perform the operations of the above-described exemplary embodiments of the inventive concept, or vice versa.

According to an exemplary embodiment, in the input/output system and the method for the set-top box using the terminal, the terminal may be connected with the set-top box and used as an input or output device.

According to an exemplary embodiment, in the input/output system and the method for the set-top box using the terminal, the terminal may be connected with the set-top box, from which the output device is absent, and used as the output device based on ADB, MTP, or PTP. In addition, the terminal may be connected with the set-top box, from which the input device is absent, and used as the input device based on the ADB, the MTP, or the PTP.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other elements or equivalents. Accordingly, the inventive concept is not limited to such embodiments, but rather to the broader scope of the presented claims and various obvious modifications and equivalent arrangements.

What is claimed is:

1. An input/output method for a set-top box that lacks a connected display and speaker using a terminal, the input/output method comprising:
   making a connection with the terminal comprising a display unit and/or a speaker through wired or wireless communication;
   determining whether the terminal is in a receive enable state for image data or audio data; and sharing data with the terminal by transmitting the image data or the audio data to the terminal, to output an image through the display unit of the terminal or to output audio through the speaker of the terminal, when the terminal is in the receive enable state for the image data or the audio data, wherein the set-top box constitutes at least a part of an electronic device requiring inspection, said electronic device comprising a water purifier, a water boiler, a home appliance, or a traffic signal control system, and wherein the sharing of the data with the terminal comprises:

displaying a management menu of the electronic device requiring the inspection on the display unit through an application previously installed on the terminal to receive selection coordinates of an inspection menu input by a user;

inspecting the electronic device requiring the inspection with respect to a menu corresponding to the received selection coordinates; and transmitting an inspection result to the terminal to display the inspection result on the display unit of the terminal after the inspection is performed.

2. The input/output method of claim 1, further comprising:

determining whether the set-top box is in a receive enable state for user input data from the terminal; and receiving touch coordinates or a keypad input value, which is input by a user through the display unit of the terminal, to control the set-top box when the set-top box is in the receive enable state for the user input data from the terminal.

3. The input/output method of claim 2, wherein the image transmitted from the set-top box, from which a display unit is absent, is output through the display unit of the terminal in real time, or the audio transmitted from the set-top box, from which a speaker is absent, is output through the speaker of the terminal in real time, and wherein the set-top box receives the touch coordinates or the keypad input value input by the user through the display unit of the terminal.

4. The input/output method of claim 1, wherein the making of the connection with the terminal through the wired or wireless communication comprises making the wired communication with the terminal based on a universal serial bus (USB) standard protocol to support a media transfer protocol (MTP) mode or a picture transfer protocol (PTP) mode at the terminal as a USB port of the terminal is connected with a USB port of the set-top box through a universal serial bus cable.

5. The input/output method of claim 1, wherein the making of the connection with the terminal through the wired or wireless communication comprises making the wireless communication with the terminal as a wireless communication module of the terminal is connected with a wireless communication module of the set-top box through at least one of Bluetooth, near field communication (NFC), and Wi-Fi.

6. The input/output method of claim 1, wherein the determining of whether the terminal is in the receive enable state for the image data or the audio data comprises:

determining whether an application, which receives and outputs the image data or the audio data, is installed on the terminal;

providing an install file or an install guide file of the application to guide installation of the application when an application, which receives and outputs the image data or the audio data, is not previously installed on the terminal; and running the application installed on the terminal.

7. The input/output method of claim 2, further comprising displaying changed image data or changed audio data on the display unit of the terminal or inputting changed user input data into the set-top box and processing the changed user input data, wherein a callback system is configured to detect changed data when a communication protocol connection transmits an instruction and receives a result.

8. An input/output method for a set-top box that lacks a connected display and speaker using a terminal, the input/output method comprising:

making a connection with the terminal comprising a display unit and/or a speaker through wired or wireless communication;

determining whether the terminal is in a receive enable state for image data or audio data; and sharing data with the terminal by transmitting the image data or the audio data to the terminal, to output an image through the display unit of the terminal or to output audio through the speaker of the terminal, when the terminal is in the receive enable state for the image data or the audio data, wherein the set-top box constitutes at least a part of a traffic signal control system for vehicular traffic, and wherein the sharing of the data with the terminal comprises:

displaying a control menu of the traffic signal control system on the display unit through an application previously installed on the terminal to receive selection coordinates of the control menu, which is input by a user, in the set-top box; and controlling the traffic signal control system based on the received selection coordinates.

9. An input/output method for a set-top box that lacks a connected display and speaker using a terminal, the input/output method comprising:

making a connection with the terminal comprising a display unit and/or a speaker through wired or wireless communication;

determining whether the terminal is in a receive enable state for image data or audio data; and sharing data with the terminal by transmitting the image data or the audio data to the terminal, to output an image through the display unit of the terminal or to output audio through the speaker of the terminal, when the terminal is in the receive enable state for the image data or the audio data, wherein the set-top box constitutes a cloud-based box provided on a restaurant table, and wherein the sharing of the data with the terminal comprises:

displaying a menu related to terminal charging, food/drink ordering, payment, music, or images on the display unit through an application previously installed on the terminal to receive selection coordinates of the control menu, which is input by a user, in the set-top box; and controlling the cloud-based box functions related to terminal charging, food/drink ordering, payment, music, or images based on the received selection coordinates.

10. The input/output method of claim 9, further comprising:

determining whether the set-top box is in a receive enable state for user input data from the terminal; and receiving touch coordinates or a keypad input value, which is input by a user through the display unit of the terminal, to control the set-top box when the set-top box is in the receive enable state for the user input data from the terminal.

11. The input/output method of claim 10, wherein the image transmitted from the set-top box, from which a display unit is absent, is output through the display unit of the terminal in real time, or the audio transmitted from the set-top box, from which a speaker is absent, is output through the speaker of the terminal in real time, and wherein the set-top box receives the touch coordinates or the keypad input value input by the user through the display unit of the terminal.

12. The input/output method of claim 9, wherein the making of the connection with the terminal through the wired or wireless communication comprises making the wired communication with the terminal based on a universal serial bus (USB) standard protocol to support a media transfer protocol (MTP) mode or a picture transfer protocol (PTP) mode at the terminal as a USB port of the terminal is connected with a USB port of the set-top box through a universal serial bus cable.

13. The input/output method of claim 9, wherein the making of the connection with the terminal through the wired or wireless communication comprises making the wireless communication with the terminal as a wireless communication module of the terminal is connected with a wireless communication module of the set-top box through at least one of Bluetooth, near field communication (NFC), and Wi-Fi.

14. The input/output method of claim 9, wherein the determining of whether the terminal is in the receive enable state for the image data or the audio data comprises:
   determining whether an application, which receives and outputs the image data or the audio data, is installed on the terminal;
   providing an install file or an install guide file of the application to guide installation of the application when an application, which receives and outputs the image data or the audio data, is not previously installed on the terminal; and
   running the application installed on the terminal.

15. The input/output method of claim 10, further comprising displaying changed image data or changed audio data on the display unit of the terminal or inputting changed user input data into the set-top box and processing the changed user input data, wherein a callback system is configured to detect changed data when a communication protocol connection transmits an instruction and receives a result.

16. The input/output method of claim 8, further comprising:
   determining whether the set-top box is in a receive enable state for user input data from the terminal; and
   receiving touch coordinates or a keypad input value, which is input by a user through the display unit of the terminal, to control the set-top box when the set-top box is in the receive enable state for the user input data from the terminal.

17. The input/output method of claim 8, wherein the making of the connection with the terminal through the wired or wireless communication comprises making the wired communication with the terminal based on a universal serial bus (USB) standard protocol to support a media transfer protocol (MTP) mode or a picture transfer protocol (PTP) mode at the terminal as a USB port of the terminal is connected with a USB port of the set-top box through a universal serial bus cable.

18. The input/output method of claim 8, wherein the making of the connection with the terminal through the wired or wireless communication comprises making the wireless communication with the terminal as a wireless communication module of the terminal is connected with a wireless communication module of the set-top box through at least one of Bluetooth, near field communication (NFC), and Wi-Fi.

19. The input/output method of claim 8, wherein the determining of whether the terminal is in the receive enable state for the image data or the audio data comprises:
   determining whether an application, which receives and outputs the image data or the audio data, is installed on the terminal;
   providing an install file or an install guide file of the application to guide installation of the application when an application, which receives and outputs the image data or the audio data, is not previously installed on the terminal; and
   running the application installed on the terminal.

* * * * *